US010139780B2

(12) United States Patent
Rinker

(10) Patent No.: US 10,139,780 B2
(45) Date of Patent: Nov. 27, 2018

(54) MOTION COMMUNICATION SYSTEM AND METHOD

(71) Applicant: Charles Rinker, Wake Forest, NC (US)

(72) Inventor: Charles Rinker, Wake Forest, NC (US)

( * ) Notice: Subject to any disclaimer, the term of this patent is extended or adjusted under 35 U.S.C. 154(b) by 0 days.

(21) Appl. No.: 15/290,003

(22) Filed: Oct. 11, 2016

(65) Prior Publication Data

US 2018/0101135 A1 Apr. 12, 2018

(51) Int. Cl.

| | |
|---|---|
| ***G06T 13/40*** | (2011.01) |
| ***G03H 1/08*** | (2006.01) |
| ***G03H 1/22*** | (2006.01) |
| ***G06T 17/20*** | (2006.01) |
| *G06T 15/80* | (2011.01) |
| *G06T 15/04* | (2011.01) |
| *G06T 15/00* | (2011.01) |
| *G06T 13/20* | (2011.01) |

(52) U.S. Cl.

CPC ............ *G03H 1/08* (2013.01); *G03H 1/2205* (2013.01); *G06T 13/40* (2013.01); *G06T 17/20* (2013.01); *G03H 2001/2213* (2013.01); *G06T 13/205* (2013.01); *G06T 15/005* (2013.01); *G06T 15/04* (2013.01); *G06T 15/80* (2013.01); *G06T 2207/20044* (2013.01)

(58) Field of Classification Search

None

See application file for complete search history.

(56) References Cited

U.S. PATENT DOCUMENTS

| | | | | |
|---|---|---|---|---|
| 2006/0290699 A1* | 12/2006 | Dimtrva | G06K 9/00268 | 345/473 |
| 2009/0168027 A1* | 7/2009 | Dunn | G03B 21/26 | 353/28 |
| 2009/0238378 A1* | 9/2009 | Kikinis | H04N 13/0296 | 381/92 |
| 2014/0347724 A1* | 11/2014 | Schultz | G03B 21/62 | 359/450 |

* cited by examiner

*Primary Examiner* — Eileen M Adams

(74) *Attorney, Agent, or Firm* — John L. Sotomayor

(57) ABSTRACT

This document presents an apparatus and method for creating and displaying a three dimensional CGI character performing signs and gestures that form a motion communication capability. The 3D CGI character is created as a digital construct that is displayed on a silhouette that has an outline of the character created. The top portion of the display silhouette is transparent. A holographic projector displays the 3D CGI character on the transparent portion of the display silhouette. The bottom half of the display silhouette is opaque and conceals the CPU and projector components. The entire silhouette performs as a communicator using a gesture-based communication protocol for presenting signs and gestures of a defined sign language while also speaking the phrases being communicated by the signs and gestures.

20 Claims, 5 Drawing Sheets

MOTION COMMUNICATION SYSTEM AND METHOD

COPYRIGHT NOTICE

A portion of the disclosure of this patent document contains material that is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Computer generated characters are a standby of films, cartoons, movies, and other interactive video displays. Renderings of such computer generated characters may be seen on computer, television, mobile device, and other screens, but holographic, three dimensional characters are not as freely available due to the more expensive equipment required to display a three dimensional character.

Holographic projectors and display systems exist that permit the creation and display of three-dimensional characters. However, the creation of such characters often requires a fully equipped video production studio each time a change or generation of a new character is necessary. Additionally, the display requirements of a holographic system often require a large space to accommodate the projection equipment. Communication may be enhanced using such three-dimensional interactive video displays.

Likewise, automated attendants having a lifelike appearance are infrequent due to the complexity of the display equipment required to create and render such attendant images. Interactive systems have been attempted on occasion with little long-term success, although such lifelike, interactive systems would be useful in many situations where such an automated attendant may enhance physical communication.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
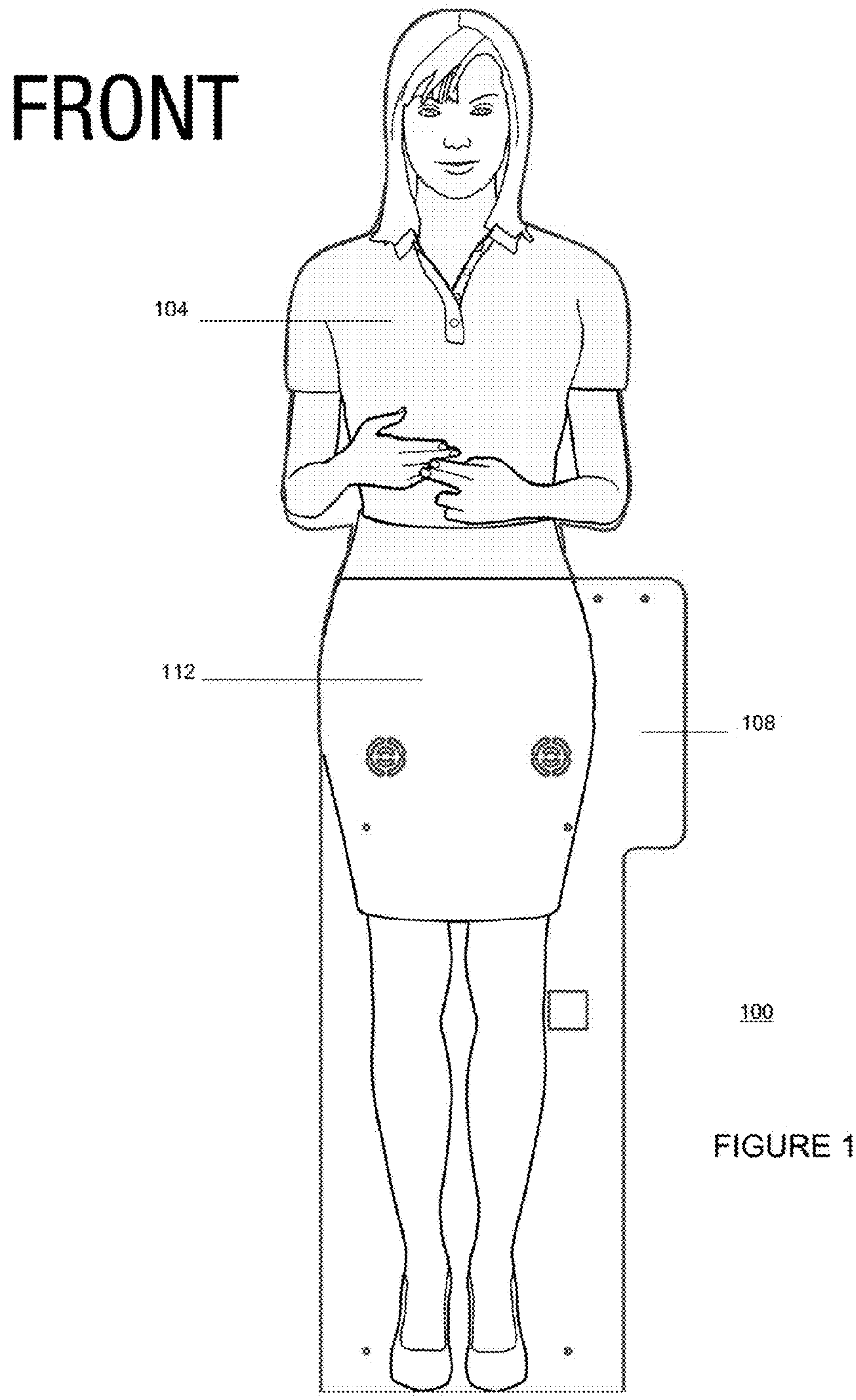
FIG. 1 is a front view of the display apparatus for a 3D Computer Generated Imagery (CGI) character communicating using sign language consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Reference throughout this document to "motion communication system" or similar terms means a visual system of communication where gestures and motion are used to convey meaning to foster communication between one person and another person, between one person and a group of people, or between groups of people. In this communication system the gestures and motions may be recorded, computer generated, generated using a video capture system, or any combination of recording, video capture and computer generation.

Reference throughout this document to "ASL" refers to American Sign Language.

Reference throughout this document to "sign language" refers to any standardized system of sign language gestures and motions that have been codified into a labeled sign language. Some examples of these are American Sign Language, British Sign Language, Australian Sign Language, and any of the more than 130 other standardized sign language implementations currently recognized.

In an embodiment, PRSONAS leverages advanced computer generated characters to create flexible, photo realistic human and non-human character representations that offer several advantages of video and other media. Advanced computer generated characters permit complete cosmetic customization based on client requirements including hair color, eye color, skin color, wardrobe, etc., and an ability for single PRSONAS computer generated character to speak literally any language and the ability to change at will simply by updating the spoken voice. Remote content updates are possible without requiring any updates to the physical structure of the PRSONAS unit, and there is no need for expensive (or repeated) video productions to capture initial messaging or to update existing messaging.

In an exemplary embodiment, a PRSONAS computer generated character is created through a multistep pipeline process. In addition to the multistep pipeline process of character creation, the system also keeps the silhouette of the CGI character fixed to permit the character to remain centered in the silhouette. Remaining centered in the silhouette retains an illusion of a character having mass within the silhouette. The system also maintains "lighting masks" and "color masks" to keep an even light and even color when being projected in an ultra-short throw holographic projection system, as used in this system. Generating CGI characters is accomplished by completing the following key milestones.

The first step in the pipeline to create a CGI character is modeling. Modeling is the creation (or modification from existing template character) of a 3D mesh forming the structure of the character. In an exemplary embodiment, the CGI character is only modeled from the waist up. The portion of the CGI character from the waist down is printed on the acrylic surface of the display portion. Only the front half facing the camera is modeled to optimize speed and to create fluid animation even on moderate to low end computer hardware.

The next step in the pipeline to create a CGI character is Texturing. Texturing is the process of applying virtual materials including skin tones, clothing and any texture or shader that may be used to create the look of a solid object. A shader is an algorithm used to render the appearance of a solid surface programmatically, providing the ability for realistic physics including stretching and folding. The utilization of shaders assists in the illusion of photorealistic image for the CGI character when active in the display.

The next step in the pipeline to create a CGI character is rigging. Rigging is the process of attaching a virtual skeleton like structure to the mesh created above. The virtual skeleton allows the animators to more easily move and pose the mesh structure through the manipulation of "joints" and "positions" without the need to move individual vertices used to create the mesh. Each vertex (point) in the mesh is weighted against the bone structure of the skeleton to give realistic movement in relationship to the skeleton.

The next step in the pipeline to create a CGI character is Lip Synchronization (Lip Sync). Lip sync is an advanced animation process similar to the Rigging step, but may incorporate other advanced animation rigging structures to provide the extremely sensitive control needed to create realistic facial expressions and movement for synchronization to the spoken voice over.

The next step in the pipeline to create a CGI character is lighting. Lighting is the process of positioning virtual lighting and effects into the above items to create a realistic "scene" capable of being rendered. The goal is to mimic realistic environmental lighting so the character appears to be physically present in the real world environment in which it is placed.

The next step in the pipeline to create a CGI character is rendering. Rendering is the process of using light simulations, ray tracing and other industry rendering technologies to turn the above CGI character development process into a completed image.

The process defined in these steps creates an output of a digital file containing all elements required to recreate the completed CGI character. The digital file is referred to as a 'character scene'. This 'character scene' may then be provided as input to a delivery system to prepare the 'character scene' for display.

The delivery of the CGI imagery into the physical world utilizes the hardware integration between the display hardware setup and the 'character scene.' The 'character scene' derived from the creation process is fed into 3Dimensional (3D) real-time rendering software running on a CPU/render hardware. The render hardware sends a digital video output to the projector contained in the system chassis. The projector provides the rendered image to an acrylic silhouette that is constructed to match the exact outline of the projected CGI character image previously defined. The image is projected onto a film adhered to the back of the acrylic silhouette. In an embodiment, an extension of the use of a computer generated character is the ability of the computer generated character to produce physical hand and arm positions that are used in a motion communication system such as a sign language. In use in the United States, American Sign Language (ASL), may be produced by a 3D, holographic computer generated character due to the ability to produce signs that form ASL concepts in three dimensions. This capability permits an advanced computer generated character to serve as an automated attendant, perform in a docent role, permit the translation from standard spoken United States languages into ASL for real time or pre-recorded speeches, or provide information in ASL to the hearing impaired in any public forum such as schools, churches, hospitals, or other public buildings.

The motion communication system is not restricted to a computer generated character providing communication in ASL. Due to the nature of motion capture and generation capabilities of current computer systems, any defined or known sign language may also be presented by a computer generated character. Additionally, the system may be designed to provide language translation and communication utilizing human-like or non-human-like characters by creating the positions and motions required for the physical language signs in a 3-dimensional view space and directing the computer generated character to form those positions and motions when in operation.

In a non-limiting embodiment, the animation instructions for the motions that are used to convey meaning in the motion communication system, such as ASL, are created by an animator. The animator may build a catalogue of defined gestures by hand keying in the animation for the gestures and/or signs to be performed by the computer generated character. To build the catalogue of defined gestures, or signs, the animator may create key frames for the animation of each sign and develop the signs by mapping the signs onto the character that is to deliver the signs when the computer generated character is active.

In an alternative embodiment, the gestures and/or signs may be performed by a live actor while wearing motion capture gloves and connecting the gloves to a motion capture software module. The actor may then perform each ASL sign while connected to the motion capture system and the signs may be captured and transmitted to the motion communication system. Once received, an animator may map the captured signs onto the computer generated character. The mapped signs may then be stored in a catalogue for future use when the system is active.

Upon completion of a catalogue for a particular sign language, ASL or any other defined sign language, the motion communication system may be provided with a script through a text to speech capture capability. The motion communication system may then use the sign catalogue for the particular sign language to be presented by the computer generated character. The input text may be parsed for equivalent similar signs. The motion communication system may be used to generate translation into signs and gestures based upon the cognitive meaning of textual information that is to be conveyed to the deaf or hearing-impaired person(s) who are observing the CGI character. Textual information is not presented in a straight word to gesture or sign translation due to the fact that a sign or gesture may represent a syllable, a sound, a portion of a word, a letter, multiple words, or even an entire concept encompassing multiple words and punctuation based upon the cognitive meaning. Thus, in this embodiment, the motion communication system would need to parse the incoming text or speech into words, concepts, ideation, numbers, or other segments of cognitive meaning for which gestures or signs are available as part of the catalogue, where the catalogue forms a lexicon for the translation into a sign language from the input text.

In an additional embodiment, the parsing system may also receive text from a speech to text translation module that is capturing and processing speech in real time. The speech to text module may work in a similar fashion to a closed-captioning system, where the output of the closed-caption system would form the input text to the motion communication system. The motion communication system would utilize the incoming stream of text as the information to be parsed. The output would once again be composed of signs and gestures retrieved from the sign language lexicon and transmitted to the computer generated character for representation as visual communication in the selected sign language. In this fashion, the motion communication system could provide for real-time translation from spoken language to sign language with no need for a human translator to be involved in the process.

In this non-limiting embodiment, the scene in which the computer generated character is acting includes the capability to present information to a viewer in recognizable sign language constructs. The arms and hands of the computer generated character may be positioned, based upon the action of one or more animators, in the appropriate configuration and relevant positions necessary to reproduce the signs and gestures of a recognizable sign language, such as ASL. In an additional aspect, the computer generated character may also audibly reproduce the input speech to provide both hearing and hearing impaired persons to understand the communication being provided by the computer generated character.

In this non-limiting embodiment, the computer generated character may be presented in an upper torso silhouette. Most signs defined in a sign language rely on the movement of hands and arms, and to a lesser extent on facial expressions and facial feature movement. Thus, the upper torso representation readily permits the generation of motion communication in the form of one or more sign languages. On the front surface of the acrylic silhouette, a printed opaque image of the bottom half of the CGI character is attached as a solid, unchanging portion of the CGI display. The illusion, when viewed form the front of the unit creates a life size, complete image of the CGI character presented in a holographic silhouette display, while obscuring or completely hiding the chassis that encloses all of the supporting hardware and software of the holographic display unit.

In a non-limiting embodiment, the system and method presents a system for computer generated image (CGI) character generation and display for a motion communication system, where the CGI character is presenting gestures and motions intended to communicate the elements of a structured sign language to a viewer through signs and gestures. The motion communication system having a display silhouette device, a software module for creating a CGI character for projection onto the display silhouette device, and where the projection is delivered as a holographic projection onto the rear surface of the display silhouette device. The display silhouette device having the exact outline of a CGI character to be displayed on the display silhouette device, and the display silhouette device is manufactured of an acrylic material; further comprising a transparent film adhered to the back surface of the acrylic material.

In the exemplary embodiment, the upper portion of the display silhouette device is transparent and the lower portion of the display silhouette device is opaque. The display silhouette device is a unit that also includes an equipment chassis into which are installed a CPU and rendering hardware component into which is installed 3D real-time rendering software, and a 3D holographic projector component. The holographic projector may be an ultra-short throw holographic projector to perform the projection of the CGI character. The display silhouette device, equipment chassis, and 3D holographic projector component comprise a stand-alone display device having a physical space requirement small enough to permit the stand-alone display device to be installed and operate in the space usually reserved for a receptionist in any office or venue.

In this embodiment, the CGI character creation software module maps signs, gestures, and facial video sequences into a three dimensional CGI character completed image. The CGI character creation software module creates a three-dimensional digital video output for projection onto the display silhouette device to provide communication to viewers who are hearing challenged and those who hear normally. The signs and gestures that form communication through the structure of one or more defined sign languages are presented visually by the CGI character. In an alternative embodiment, the visual representation for the communication in sign language may be presented by a CGI character while simultaneously presenting the same communication in an audible form. Additionally, the system and method may have a software module to receive remote content updates for the CGI character and applies the remote content updates to a three-dimensional digital video output to update the projection of the CGI character.

Turning now to FIG. 1, this figure presents a front view of the display apparatus for a 3D CGI character consistent with certain embodiments of the present invention. In an exemplary embodiment, the display apparatus 100 is shaped in the approximate silhouette of a human figure. The upper portion of the display apparatus 104 is composed of a transparent material, such as, in an exemplary embodiment, acrylic, upon which the upper portion of a 3D CGI character may be displayed. The projection sensitive film may be adhered to the back surface of the acrylic transparent material and provide the surface onto which the holographic image of the 3D CGI character is projected. The 3D CGI character may be the upper half of a human character, cartoon character, fictional character, or any other character that may conform to the approximate shape of the silhouette forming the upper portion 104 of the display apparatus 100.

In this embodiment, the lower portion 108 of the display apparatus 100 conforms to the silhouette shape of the lower half of a human character. The lower portion 108 is also composed of an acrylic material. An opaque print of the 3D CGI character is adhered to the front surface of the lower portion 112 of the display apparatus 100. The display of the 3D CGI character on the upper portion 104 of the display apparatus 100 in combination with the opaque print of the bottom of the 3D CGI character on the bottom portion 112 of the display apparatus 100 provides the illusion of a full front view of the 3D CGI character. When viewed from the front of the display apparatus 100 this combination creates a life size complete image of the CGI character.

Figure 2:
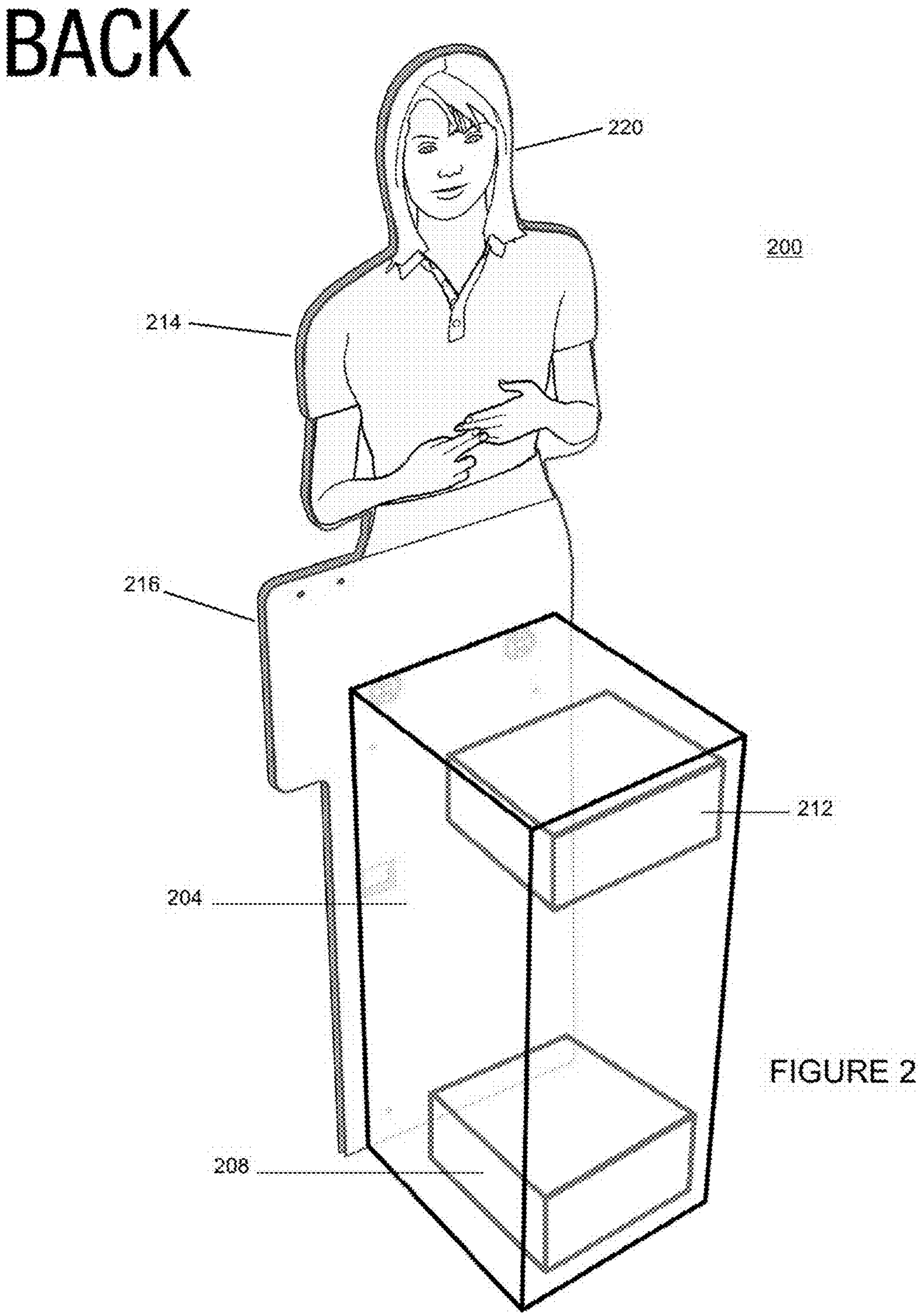
FIG. 2 is a view of the rear portion of the display apparatus consistent with certain embodiments of the present invention.

Turning now to FIG. 2, this figure presents a view of the rear portion of the display apparatus consistent with certain embodiments of the present invention. In an exemplary embodiment, the rear view of the display apparatus 200 presents a system chassis 204 into which a central processing unit (CPU) and render hardware 208 and a holographic projector 212 are installed. The 3D character silhouette 214 is attached to the front portion of the system chassis 204 in such a fashion that an opaque portion of the 3D character silhouette 216 completely hides the system chassis 204 and all components installed within the system chassis from viewers standing in front of the 3D character silhouette 214.

The 3D character silhouette 214 is composed of two portions, as previously described. The opaque portion of the 3D character silhouette 216 forms the bottom portion of the 3D character silhouette 214, and a transparent portion of the 3D character silhouette 220 forms the upper portion of the 3D character silhouette 214. The CPU and render hardware 208 is electrically connected both to a battery or other external power source (not shown) and to the holographic projector 212.

Additionally, the CPU and render hardware 208 has a data connection to the holographic projector 212 to provide the digital character information to be projected onto the upper portion of the 3D character silhouette 214. A digital character and character scene is transmitted over the data connection from the CPU and render hardware 208 to the holographic projector 212. The digital character scene is then projected onto a film that has been installed on the back side of the upper portion of the 3D character silhouette 220.

Figure 3:
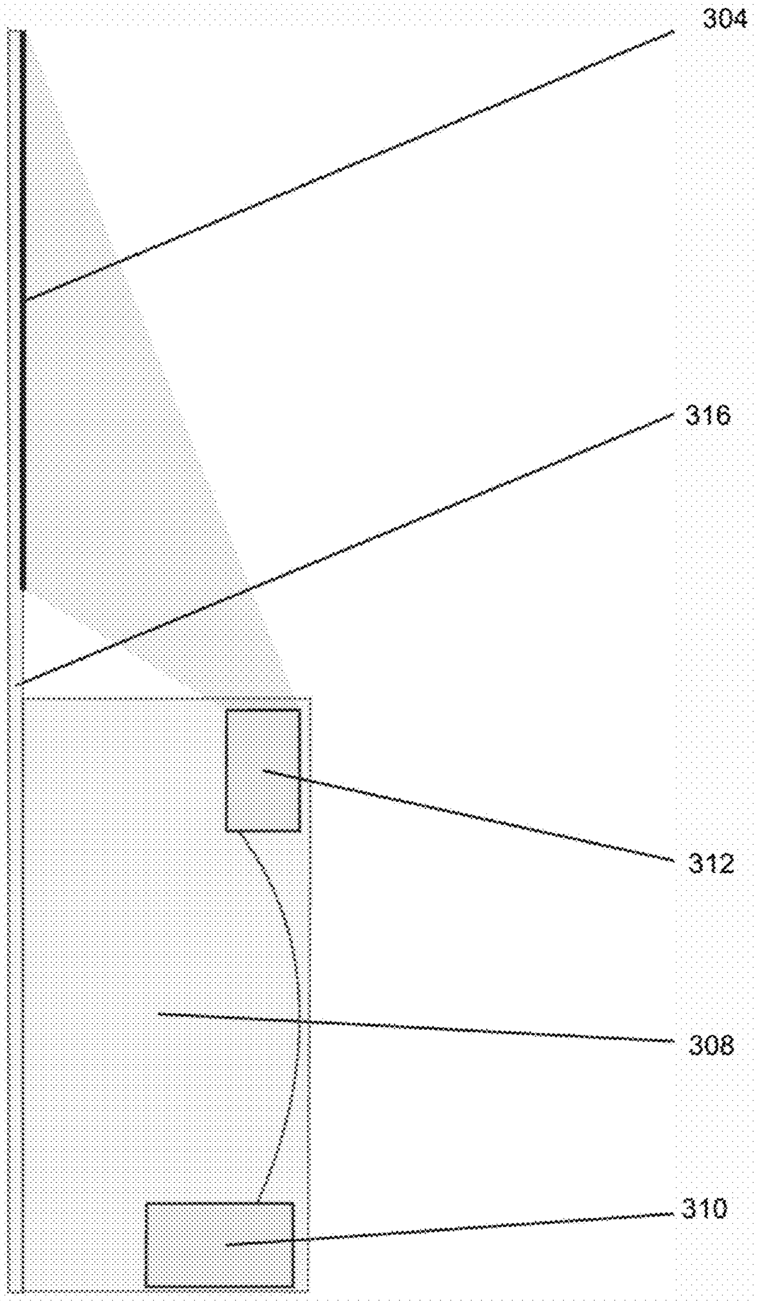
FIG. 3 is a side view of the 3D character projection in operation consistent with certain embodiments of the present invention.

Turning now to FIG. 3, this figure presents a side view of the 3D character projection in operation consistent with certain embodiments of the present invention. In an exemplary embodiment, a 3D character projection system and method presents the delivery of generated 3D CGI imagery onto an upper portion of a character silhouette 304. The 3D character projection system may have an equipment chassis 308 into which are installed a CPU and rendering hardware component 310 into which is installed 3D real-time rendering software, and a 3D ultra-short throw projector component 312. Additionally, the equipment chassis 308 also encloses both power and data transmission connections. Power may be provided to the components through either battery or wired connection to an external power source (not shown). Data connections may be made between the CPU and rendering hardware component 310 and the 3D ultra-short throw projector component 312 to transmit 3D character digital files containing character imagery and scenes for display on the upper portion of the character silhouette 304.

Additionally, the character silhouette 304 may have a lower portion that is opaque 316. The opaque portion 316 of the character silhouette 304 is shaped such that it keeps the equipment chassis 308 and all installed components from being seen when the character silhouette 304 is viewed from in front.

When in operation, digital character and character scene data files are transferred from the CPU and rendering hardware component 310 to the 3D ultra-short throw projector component 312 through a data connection between the two components. The digital character and character scene data is formatted for display by the 3D ultra-short throw projector component 312 and projected onto the reverse side of the upper portion of the character silhouette 304. Because the upper portion of the character silhouette 304 is transparent, the characters and character scenes are visible to individuals standing in front of the character silhouette 304. The characters and character scenes appear to be a three-dimensional, holographic representation of the characters and character scenes to viewers positioned in front of the character silhouette 304.

Figure 4:
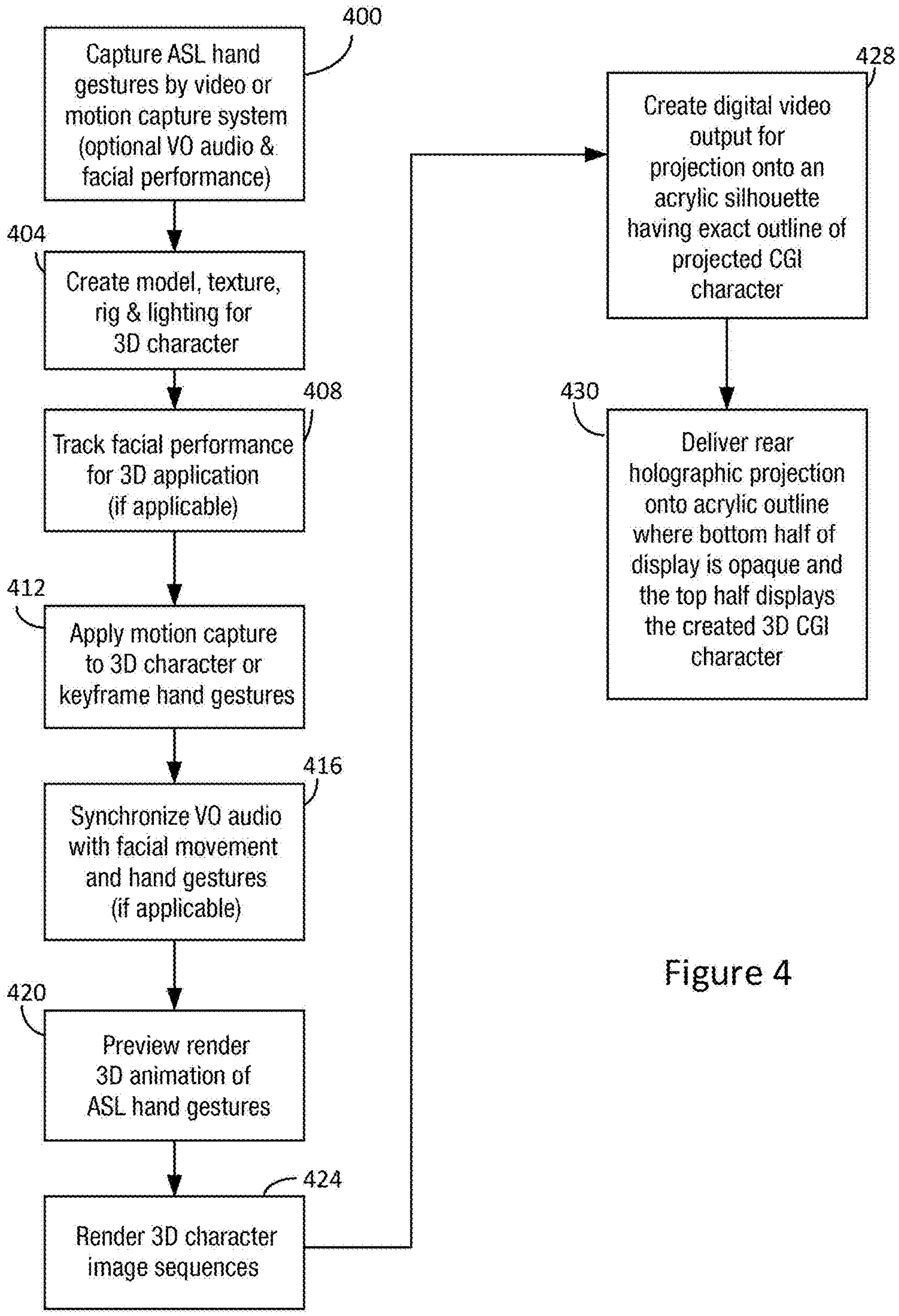
FIG. 4 is a flow diagram of the creation of a 3D holographic CGI character communication system consistent with certain embodiments of the present invention.

Turning now to FIG. 4, this figure presents a flow diagram of the creation of a 3D holographic display character consistent with certain embodiments of the present invention. In an exemplary embodiment, the creation of a 3D CGI character for transmission and display on a 3D holographic display apparatus begins at 400 with the capture of a voice over performance of a written script. The capture includes the capture of facial video sequences, and signs and gestures representing defined sign language communication as performed by hands and arms of the person speaking during the voice over performance. In an exemplary embodiment, to optimize speed of the video capture and creating fluid animation even on moderate to low end computer hardware, the video capture is performed for the front portion of a performer and only from the front side.

At 408 changes to the visual appearance of the performer's facial expression are captured, analyzed and saved to create the look of a solid object for the 3D CGI character created from the video capture. Texture and shading includes adding skin tones, clothing, hair, and additional data from one or more shaders to complete the appearance of a solid object. Shaders are algorithms that are used to render the appearance of a solid surface programmatically to provide the ability for the 3D CGI character to appear to obey realistic physical limitations on movement, such as stretching and folding. Shaders assist in the creation of the illusion of a photo realistic image for each 3D CGI character.

At 412, the motion of the performer's upper body (especially arm and hand motions) are captured, analyzed and saved. The facial expressions and motions of the performer's upper body are captured substantially simultaneously. At 416 time references are created to synchronize the text of the script with the motions of the performer's facial features and body motions. The correlation of these items is saved in a catalogue. The catalogue allows a specific textual word or phrase to be associated with a predefined gesture that has been defined in one or more established sign language formats. For example, the textual phrase "thank you" can be associated with the facial expressions used during the speaking of the phrase and with a specific arm and hand motions used to voice "thank you" in a defined sign language such as, in a non-limiting example, ASL. It must also be understood that other sign languages or motion communication standards may be associated with a captured combination of facial expressions and specific arm, hand, and upper body motions without departing from the spirit of the invention. A rigging process step is next performed to attach a virtual skeleton-like structure to mesh previously created. This rigging permits animators to more easily move and pose the mesh structure through the manipulation of "joints" and "positions" without the need to move individual vertices that were used to create the mesh as a whole.

At 416, a lip synchronization step is performed to synchronize the spoken script with facial movement and expressions. Additionally, the motions of the upper body, including the movements of the hands, arms, shoulders, and other portions of the upper body may be synchronized to the spoken script in conjunction with the lip synchronization. The lip synchronization step may incorporate additional advanced animation rigging structures to provide the extremely sensitive control needed to create realistic facial expressions and movement for synchronization to the spoken text. This combination of lip and upper body synchronization to the spoken script permits the creation of a motion communication performance that conveys substantially the same information to both hearing and hearing impaired individuals who may be viewing the CGI character display simultaneously.

At 420 the performer and others involved in creating the 3D character may preview the captured scenes by having the character rendered using the captured gestures. As portions of the textual script are played back the rendering engine can produce the projected gestures necessary to 'speak' the words and phrases using a defined sign language or motion communication system such as, in a non-limiting example, ASL. If any portion of the recorded performance by the live performer is deemed incorrect or imprecise it can be recorded again and replace the saved gestures, signs, and lip movements for that portion of the performance.

When the complete catalogue has been established, then the 3D character may be observed performing a playback of some textual input by rendering character sequences 424 producing the signs, gestures, and lip movements representing the textual inputs.

In this exemplary embodiment, at 428 the system creates a 3D digital video output. The 3D digital video is transmitted from the CPU/rendering apparatus to the 3D ultra-short throw projector apparatus. The 3D digital video file is projected onto an acrylic silhouette having the exact outline of the projected 3D CGI character as represented in the 3D digital video output file. At 430, the 3D CGI character digital video file is delivered as a rear-holographic projection through an ultra-short throw holographic projector onto an acrylic silhouette, where the bottom half of the silhouette is opaque and the top half is transparent, displaying the created 3D CGI character.

This rendering may be used to create the digital video output projected 430 to fit within the transparent portion of the acrylic silhouette. This video may be projected onto the rear of the upper half of the silhouette to complete the upper half image of the character while the lower half of the silhouette displays a static image, which is silk-screened or otherwise printed to the opaque lower half of the silhouette.

Figure 5:
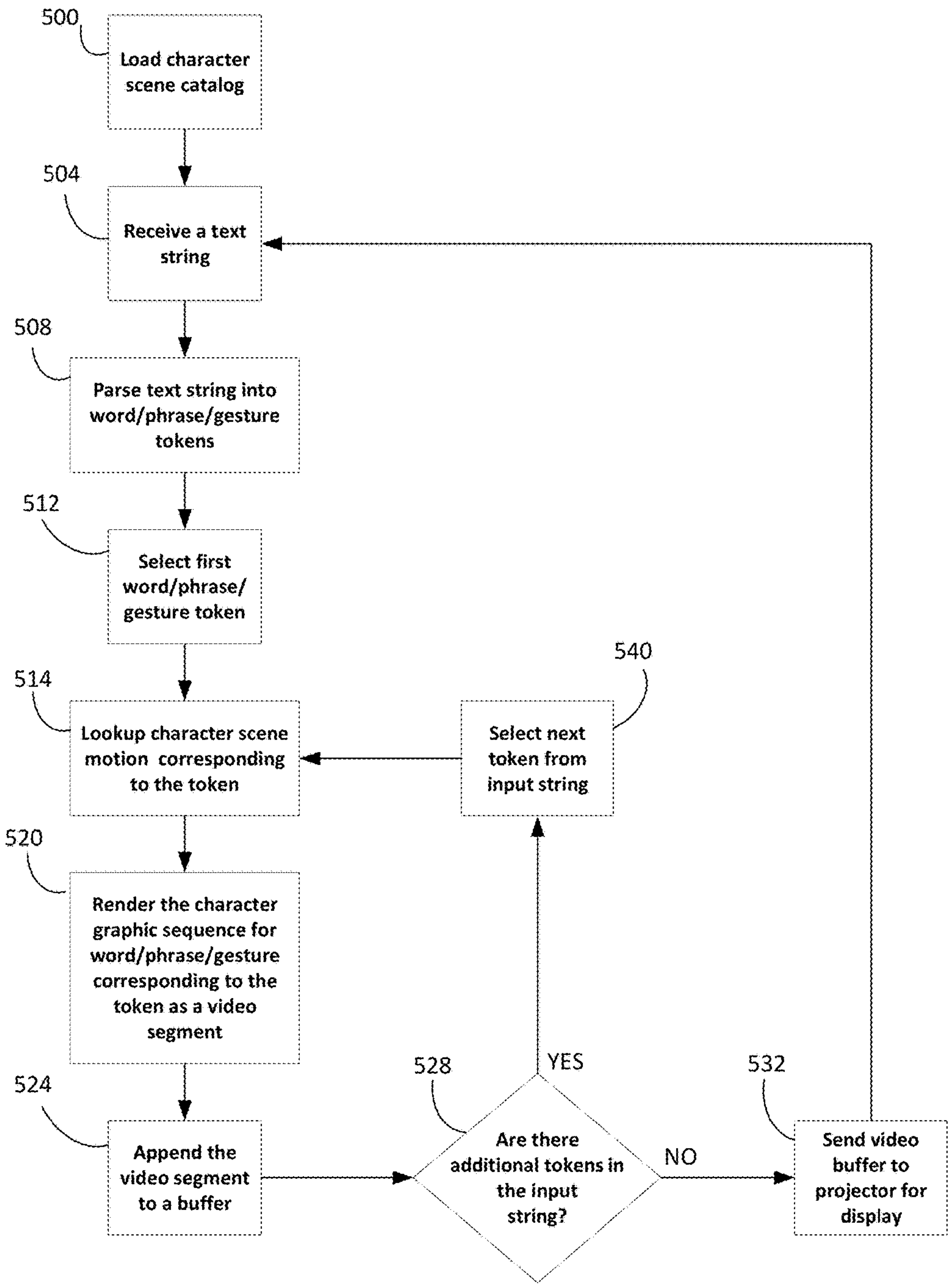
FIG. 5 is a flow diagram for the operation of a motion communication system consistent with certain embodiments of the present invention.

Turing now to FIG. 5, this figure presents a flow diagram for the operation of a motion communication system consistent with certain embodiments of the present invention. At 500, the system loads the predefined character scenes that are collections of predefined gestures. It also loads the catalogue to associate textual inputs to the predefined gestures. The character scenes and catalogue originated during the creation of the character as described in FIG. 4.

At 504 the system receives a text string representing the message to be conveyed using the 3D character. In one embodiment, the text string is a predefined static message of any length that was programmed into the software or data set of the 3D character, such as an introductory message. In another embodiment, the text string is a dynamically created message built in response to recent stimulus. For example, if the 3D character is requested to report on the status of some parameter such as 'flight delays' it must first determine the value of that parameter and then incorporate the value of the parameter into an appropriately selected response message. In yet another embodiment, the text string may be the output of a text-to-speech conversion recently performed by a speaker present near the 3D character and the 3D character may then translate the spoken message into a sign language such as, in a non-limiting example, ASL.

At 508, the text string may be parsed into tokens representing a word, phrase, or gesture. For example, if the text string is "thank you for coming" the system may find gestures for the individual words "thank", "you", "for", and "coming" in the catalogue. It may also find the phrase "thank you" in the catalogue—associated with a different gesture than the individual words "thank" and "you". This indicates that a specific gesture exists in the catalogue for the phrase "thank you" and it would be desirable to use the ASL gesture for "thank you" instead of gestures for the individual words. In general, tokens may be constructed to match the longest sequence of text that has a matching entry in the catalogue.

At 512, the first token found in the text string is selected for further processing. At 514, the catalogue is used to find the predefined gestures associated with the selected phrase. At 520, the predefined gestures are rendered into a character image. In one embodiment, the corresponding text string may also be processed into an audio stream using speech synthesis. The output of step 520 is a short video segment (and optionally an associated audio segment) representing the 3D character's motion and sounds associated with a portion of the text string. At 524, the video and audio segments are appended to the end of a buffer.

At 528, a test is performed to see if there are additional tokens from the text string that require processing. If there are, the YES exit from step 528 may be taken leading to step 540. At 540, the next sequential token may be selected for processing and then processing repeats from step 514. If there are no further tokens to process, the NO exit from step 528 leads to step 532. At 532, the video (and audio) buffer may be sent to the projection display so that the 3D character may perform the gestures and make the sounds dictated by the input text string. The system then returns to step 504 to await the arrival of the next input text string.

Those skilled in the art will recognize that the act of buffering the video and audio segments may be performed in a number of different ways and at different locations within the system. For example, in one embodiment the buffer may be an area of memory within the computer and this buffer is then sent to the projector when the buffer is full or the text processing is complete. In a different embodiment, the buffer may be located within the projector such that the computer can send the individual video and audio segments as they are created and allow buffering to occur within the projector.

While certain illustrative embodiments have been described, it is evident that many alternatives, modifications, permutations and variations will become apparent to those skilled in the art in light of the foregoing description.

What is claimed is:

1. A system for computer generated image (CGI) motion communication capability, comprising:
- a display silhouette device;
- a module for creating a computer-generated character for projection onto the display silhouette device;
- a module for creating the positions and motions required for physical language signs and gestures in a 3-dimensional view space;
- a module operative to select one or more of said created signs and gestures to convey information to a viewer;
- a module operative to present the one or more selected signs and gestures as an information projection;
- a module directing said computer-generated character to form said selected signs and gestures;
- where the information projection of said selected signs and gestures are delivered as a holographic projection onto the rear surface of the display silhouette device.

2. The system of claim 1, further comprising a display silhouette device having the exact outline of a CGI character to be displayed on the display silhouette device.

3. The system of claim 1, where the display silhouette device is manufactured of an acrylic material, further comprising a transparent film adhered to the back surface of the acrylic material.

4. The system of claim 3, where the upper portion of the display silhouette device is transparent and the lower portion of the display silhouette device is opaque.

5. The system of claim 1, where the display silhouette device comprises an equipment chassis into which are installed a CPU and rendering hardware component into which is installed 3D real-time rendering software, and a 3D holographic projector component.

6. The system of claim 1, where the CGI character creation software module maps voice over and facial video sequences into a three-dimensional CGI character completed image.

7. The system of claim 6, where the CGI character creation software module creates a three-dimensional digital video output for projection onto the display silhouette device.

8. The system of claim 1, further comprising a software module operative to select the one or more signs and gestures from a catalogue of signs and gestures associated with a sign language.

9. The system of claim 1, further comprising an ultra-short throw holographic projector to perform the projection of the CGI character.

10. The system of claim 5, where the display silhouette device, equipment chassis, and 3D holographic projector component comprise a stand-alone motion communication display device having a physical space requirement small enough to permit the stand-alone display device to be installed and operate in the space usually reserved for a receptionist in any office or venue.

11. A process for computer generated image (CGI) motion communication system, comprising:

a display silhouette device;

creating a computer-generated character for projection onto the display silhouette device;

creating the positions and motions required for physical language signs and gestures in a 3-dimensional view space;

selecting one or more of said created signs and gestures to convey information to a viewer;

presenting the one or more selected signs and gestures as an information projection;

directing said computer-generated character to form said selected signs and gestures;

where the information projection of said selected signs and gestures are delivered as a holographic projection onto the rear surface of the display silhouette device.

12. The process of claim 1, further comprising a display silhouette device having the exact outline of a CGI character to be displayed on the display silhouette device.

13. The process of claim 1, where the displayed CGI character moves hands, arms, facial muscles, and any other body portion required to present a sign or gesture that communicates information to a viewer.

14. The process of claim 11, where the upper portion of a display silhouette device is transparent and the lower portion of the display silhouette device is opaque.

15. The process of claim 11, installing within an equipment chassis a CPU and rendering hardware component into which is installed 3D real-time rendering software, and a 3D holographic projector component.

16. The process of claim 11, where the CGI character creation software module maps voice over and facial video sequences into a three-dimensional CGI character completed image.

17. The process of claim 16 further comprises creating a three-dimensional digital video output for projection onto the display silhouette device.

18. The process of claim 11, further comprising selecting the one or more signs and gestures from a catalogue of signs and gestures associated with a sign language.

19. The process of claim 11, further comprising performing the projection of the CGI character using an ultra-short throw holographic.

20. The process of claim 15, further comprising displaying the communication motions on a stand-alone display device having a physical space requirement small enough to permit the stand-alone display device to be installed and operate in the space usually reserved for a receptionist in any office or venue.

* * * * *